United States Patent [19]

Diels

[11] Patent Number: 4,525,843
[45] Date of Patent: Jun. 25, 1985

[54] RING LASER WITH WAVEFRONT CONJUGATING BEAMS

[75] Inventor: Jean-Claude Diels, Denton, Tex.

[73] Assignee: The United States of America as represented by the Secretary of the Navy, Washington, D.C.

[21] Appl. No.: 373,188

[22] Filed: Apr. 29, 1982

[51] Int. Cl.³ .............................................. H01S 3/083
[52] U.S. Cl. ...................................... 372/94; 372/97; 372/64; 372/21; 356/350; 350/425
[58] Field of Search ............... 372/94, 21, 20; 378/64, 378/92; 350/425; 356/350, 393

[56] References Cited

U.S. PATENT DOCUMENTS

| 4,233,571 | 11/1980 | Wang et al. | 372/21 |
| 4,247,831 | 1/1981 | Lindop | 372/94 |
| 4,429,393 | 1/1984 | Giuliano | 372/94 |

OTHER PUBLICATIONS

Kaptam et al., "Enhancement of the Sagnac Effect due to Nonlinearly Induced Nonreciprocity"; Opt. Lett., vol. 6, No. 12, Dec. 1981.
Diels et al.; "Influence of Wave-Front-Conjugated Coupling on the Operation of a Laser Gyro"; Opt. Lett., vol. 6, No. 5, May 1981.

Primary Examiner—William L. Sikes
Assistant Examiner—Léon Scott, Jr.
Attorney, Agent, or Firm—Robert F. Beers; Joseph M. St. Amand; Thomas M. Phillips

[57] ABSTRACT

An improvement for a ring laser gyro employs insertion of a wavefront conjugating coupling element inside a laser cavity to reduce the lock-in threshold and to reduce the imbalance between the amplitudes of the opposite direction traveling waves (ODTW) in homogeneously broadened rotating ring lasers.

5 Claims, 4 Drawing Figures

RING LASER WITH WAVEFRONT CONJUGATING BEAMS

BACKGROUND OF THE INVENTION

If a ring laser is rotated, the cavity round trip time becomes different for the two oppositely traveling waves (ODTW). This implies the two oppositely traveling waves have to assume different frequencies. If portions of each of the ODTW are allowed to exit the cavity and are mixed, a beat frequency can be detected that is proportional to the applied rotation rate. This is the ideal laser gyro. In practice, however, there is a coupling of the ORTW due to backscattering of one of the ODTW into the other. At low rotation rates, this coupling causes the ODTW to assume the same frequency and the beat frequency disappears. This frequency synchronization of the ODTW is termed lock-in.

A good ring laser for gyro application should not only have a minimal coupling between counterpropagating waves but also have a stable "standing wave" mode of operation when at rest. Homogeneously broadened gain media such as in solid state and dye lasers have therefore been ruled out for gyro operation.

D. Kuhlke and R. Horak, Opt. Quant. Elect. II, 485 (1979) showed for instance that, in the case of cw dye lasers with weak backscattering coupling, there is generally a strong imbalance between the counterpropagating amplitudes. The laser operation even alternates between the two modes when the backscattering coupling exceeds a certain threshold.

SUMMARY OF THE INVENTION

The present invention is directed to an improved ring laser gyro wherein it is possible to use homogeneously broadened lasers such as a solid state or dye laser and provide a substantial reduction in lock-in frequency. This is done by the incorporation of a wavefront conjugating coupling element between the counter wave propagations of a ring laser. Accordingly, an object of the invention is to provide a means of reducing the lock-in threshold of a ring laser gyro.

Another object of the invention is to provide a means of reducing the lock-in threshold of a ring laser gyro by introducing wavefront conjugating therein.

Other objects, advantages and novel features of the invention will become apparent from the following detailed description of the invention when considered in conjunction with the accompanying drawings wherein.

Figure 1:
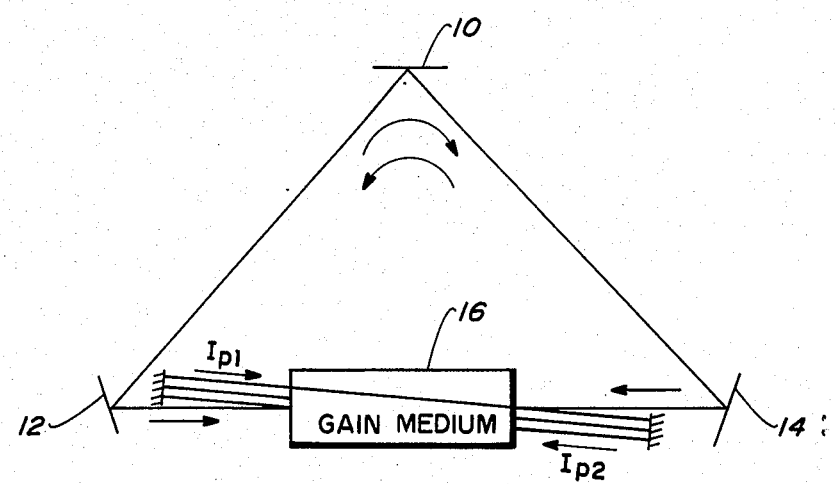
FIG. 1 is a schematic diagram of a ring laser gyro using two coupled cavities to create the wavefront conjugation.

Referring now to the drawings wherein there is shown in FIG. 1 a typical ring laser, in simplified fashion, as mirrors 10, 12, and 14 and laser gain medium 16. As shown, gain medium 16 has two coupled cavities: one short linear cavity bounding the gain medium, and the ring cavity. Wavefront conjugation arises from the mixing of the two pump beams $I_{p1}$ and $I_{p2}$ (forming standing waves) with the counterpropagating waves of the ring cavity in the gain medium.

Figure 2:
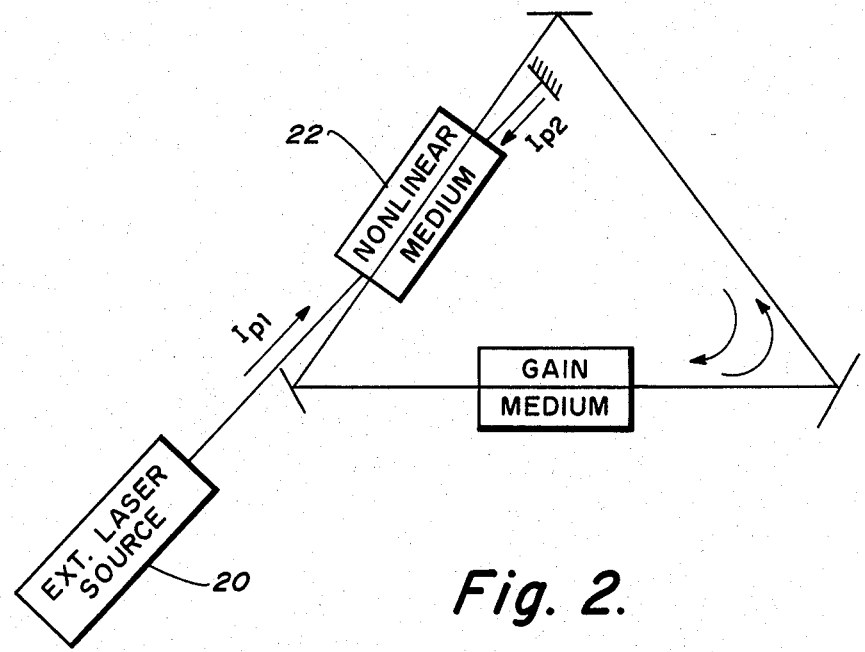
FIG. 2 is a schematic diagram of a ring laser gyro using an external laser, and four wave mixing in a resonant medium to create the wavefront conjugation.

In FIG. 2 an external laser source 20 is provided and four wave mixing in the resonant medium 22 provides the wavefront conjugation. Resonant medium 22 may be a metal vapor such as mercury or in a crystal such as $LiTaO_3$ and CdTe.

Figure 3:
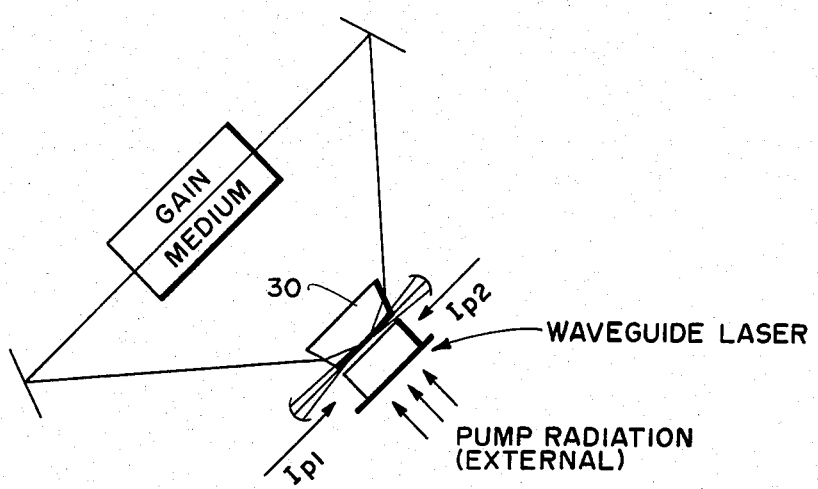
FIG. 3 is a schematic diagram of a ring laser gyro using an external laser, and four wave mixing in a turning mirror to create the wavefront conjugation.
Figure 4:
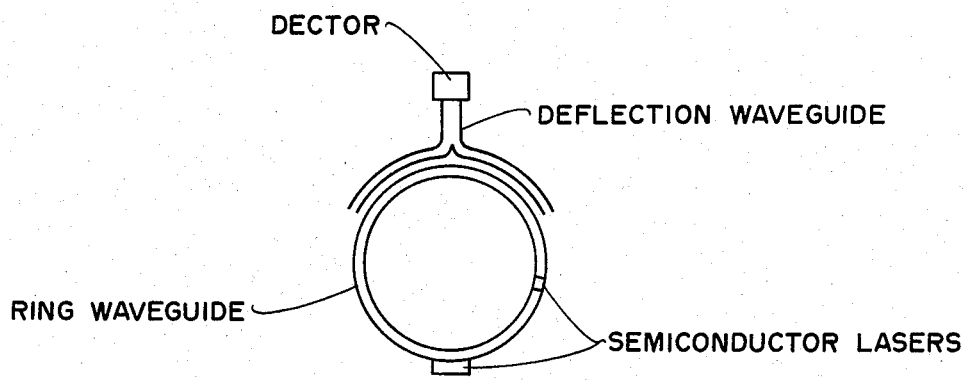
FIG. 4 is an integrated optics modification of the embodiment of FIG. 3.

In FIG. 3 an external laser is utilized with the four wave mixing being done with a turning mirror 30. The embodiment of FIG. 4 shows how the ring gyro error is detected in an integrated optics system.

In all of the above described FIGS. the embodiments all rely on the incorporation of a wavefront conjugating coupling element between the counterpropagating waves. A discussion of the theory as to how and why the insertion of a conjugating coupling element between the counterpropagating waves will reduce lock-in frequency is given in an article entitled "Influence of Wavefront Conjugated Coupling on the Operation of a Laser Gyro", by Jean-Claude Diels and Ian C. McMichael published in Optics Letters, Vol. 6, No. 5, May 1981, pp 219.

Obviously many modifications and variations of the present invention are possible in the light of the above teachings. It is therefore to be understood that within the scope of the appended claims the invention may be practiced otherwise than as specifically described.

I claim:

1. An improvement for a ring laser gyro which reduces the lock-in frequency comprising: a gain medium coupled between two optical cavity means, one cavity means forming a closed optical ring with counter wave propagations inv said ring, an the other optical cavity means being off axis to said leg containing said gain medium and forming a short linear resonant cavity, whereby wave mixing of radiation in said ring and radiations in said resonant cavity produces wave front conjugation to reduce lock in frequency of said ring laser gyro.

2. An improvement for a ring laser gyro which reduces the lock-in frequency comprising:
   a first optical cavity means forming a closed optical ring containing a gain medium in one leg of said ring and a non-linear medium in a different leg of said ring and having counter wave propagation,
   a second optical cavity means also containing said non-linear medium, said second optical cavity means delimiting said non-linear medium by a totally reflective mirror at one end and an external laser source at the other end, said second optical cavity means being off axis with respect to said first optical cavity at said different leg of said ring,
   whereby wave mixing of radiation from said gain medium in said ring and radiation from said non-linear medium in the different leg of said ring produces wave front conjugation to reduce lock-in frequency of said ring laser gyro.

3. The improvement of claim 2 wherein said non-linear medium is a metal vapor.

4. The improvement of claim 3 wherein said metal vapor is mercury vapor.

5. An improvement for a ring laser gyro which reduces the lock-in frequency comprising:
   a first optical cavity means forming a closed optical ring containing a gain medium in one leg of said ring and having counter wave propagations, a second optical cavity means contained within said ring at an apex of said ring and including a waveguide laser having two totally reflective means being disposed on end of and external to said waveguide laser, said waveguide laser being pumped by an external radiation source, said waveguide laser also containing a rotating mirror which forms an integral part of the chamber of said waveguide, whereby wave mixing of radiation from said gain medium in said ring and radiation from said second optical cavity means produces wave front conjugation to reduce lock-in frequency of said laser gyro.

* * * * *